United States Patent
Weil et al.

(10) Patent No.: US 8,898,136 B1
(45) Date of Patent: Nov. 25, 2014

(54) SYSTEM FOR CATEGORIZING DATABASE STATEMENTS FOR PERFORMANCE TUNING

(71) Applicant: Dell Software Inc., Aliso Viejo, CA (US)

(72) Inventors: Ariel Nissim Weil, West Roxbury, MA (US); Douglas Chrystall, Wellesley, MA (US); Patrick Joseph O'Keeffe, Mitcham (AU)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/010,314

(22) Filed: Aug. 26, 2013

Related U.S. Application Data

(62) Division of application No. 13/235,254, filed on Sep. 16, 2011, now Pat. No. 8,527,543.

(60) Provisional application No. 61/383,588, filed on Sep. 16, 2010.

(51) Int. Cl.
*G06F 17/30* (2006.01)

(52) U.S. Cl.
CPC .............................. *G06F 17/30306* (2013.01)
USPC ........... 707/706; 707/713; 707/722; 707/736; 707/758; 707/791

(58) Field of Classification Search
CPC ...................................................... G06F 17/30
USPC .................................................. 707/600–899
See application file for complete search history.

(56) References Cited

U.S. PATENT DOCUMENTS

2009/0077016 A1* 3/2009 Belknap et al. ............... 707/2
2010/0030817 A1   2/2010 Shang et al.

OTHER PUBLICATIONS

Splunk User Manual, Version 4.2.2, Generated Jul. 28, 2011, 215 pages.

* cited by examiner

*Primary Examiner* — Isaac M Woo
(74) *Attorney, Agent, or Firm* — Winstead PC

(57) ABSTRACT

A database statement categorization system can enable DBAs or other users to more easily find tunable database statements by categorizing the database statements. The database categorization system can analyze a DBMS to identify the types of database statements executed on the DBMS and can then categorize the statements automatically, outputting the categorization for presentation to a DBA (or other user). This categorization can advantageously separate less relevant statements that warrant less tuning or investigation from more relevant statements that may have a measurable impact on the performance of the database. By allowing users to focus on statements that are more likely to warrant attention, in certain embodiments the database categorization system streamlines the tuning process.

14 Claims, 9 Drawing Sheets

SYSTEM FOR CATEGORIZING DATABASE STATEMENTS FOR PERFORMANCE TUNING

RELATED APPLICATIONS

This application is a divisional of U.S. patent application Ser. No. 13/235,254, filed on Sep. 16, 2011. U.S. patent application Ser. No. 13/235,254 claims the benefit of priority under 35 U.S.C. §119(e) of U.S. Provisional Patent Application No. 61/383,588, filed on Sep. 16, 2010. U.S. patent application Ser. No. 13/235,254 and U.S. Provisional Patent Application No. 61/383,588 are hereby incorporated by reference in their entirety.

BACKGROUND

A database generally includes a collection of information or data organized in a way that computer programs can quickly access or select desired portions of the collection. A common type of database is the relational database, which stores data in logical structures called tables. Databases, including relational databases, can be accessed and modified using a database management system (DBMS). Several relational DBMS products are available from companies such as Oracle Corporation®, IBM®, and Microsoft® as well as from various open-source vendors.

Users can access relational databases using database statements such as Structured Query Language (SQL) statements. Because some SQL statements take longer to process than others, database administrators (DBA) often tune these statements to adjust their performance. In the average DBMS, there may be hundreds or thousands of SQL statements that a DBA reviews and evaluates to determine what to tune.

SUMMARY

In certain embodiments, a database statement categorization system can enable DBAs or other users to more easily find tunable database statements by categorizing the database statements. The database categorization system can analyze a DBMS to identify the types of database statements executed on the DBMS and can then categorize the statements automatically, outputting the categorization for presentation to a DBA (or other user). This categorization can advantageously separate less relevant statements that warrant less tuning or investigation from more relevant statements that may have a measurable impact on the performance of the database. By allowing users to focus on statements that are more likely to warrant attention, in certain embodiments the database categorization system streamlines the tuning process. The system can also categorize statements for purposes other than statement performance tuning.

In certain embodiments, a system for categorizing database statements includes a data collector that can electronically access, from a database management system, a plurality of structured query language (SQL) statements that have executed on the database management system (DBMS). The system can also include a statement classifier including computer hardware. The statement classifier can programmatically analyze the SQL statements to identify characteristics of the SQL statements and categorize the SQL statements into categories that reflect tunability of the SQL statements based at least in part on the identified characteristics of the SQL statements. Moreover, the system can include a tuning user interface that can be electronically generated for presentation to a user. The tuning user interface can include a description of the categories, thereby enabling the user to select for tuning a subset of the SQL statements based on the categories.

Additionally, in some embodiments, a method of categorizing database statements includes (by a computer system comprising computer hardware) electronically accessing, from a database management system, a plurality of database statements executed on the database management system, programmatically analyzing the database statements to identify characteristics of the database statements, categorizing the database statements into categories that reflect tunability of the database statements based at least in part on the identified characteristics of the database statements, electronically generating a tuning user interface that includes a description of the categories, and outputting the tuning user interface for presentation to a user, thereby enabling the user to select for tuning a subset of the database statements based on the categories.

Furthermore, various embodiments of a system for categorizing database statements include a data collector that can electronically access, from a database management system, a plurality of database statements executed on the database management system, and a statement classifier including computer hardware. The statement classifier can programmatically analyze the database statements to identify characteristics of the database statements and categorize the database statements into categories based at least in part on the identified characteristics of the database statements.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Some database tuning tools present every executed database statement to DBAs, including statements that DBAs cannot act upon (such as system-related statements). As a result, DBAs may train themselves to mistrust such systems or to ignore increasing amounts of the data they present. Other tuning tools merely hide less-tunable statements from DBAs, causing DBAs to potentially miss some tunable statements.

This disclosure describes embodiments of a database statement categorization system that can enable DBAs or other users to more easily find tunable database statements by categorizing the database statements. The database categorization system can analyze a DBMS to identify the types of database statements executed on the DBMS and can then categorize the statements automatically, outputting the categorization for presentation to a DBA (or other user). This categorization can advantageously separate less relevant statements that warrant less tuning or investigation from more relevant statements that may have a measurable impact on the performance of the database. By allowing users to focus on statements that are more likely to warrant attention, in certain embodiments the database categorization system streamlines the tuning process.

The database categorization system is described herein primarily with respect to SQL statements for purposes of illustration. However, the database categorization system is not limited to categorizing SQL statements. Rather, the database categorization system can categorize any form of database statement, including statements based on variants of SQL, NoSQL (non-relational or partially relational) database statements, and the like. Moreover, it should be understood that any type of database statement can be tuned, including Data Query Language (DQL), Data Description Language (DDL), Data Manipulation Language (DML), and Data Control Language (DCL).

II. Example Database Categorization System

Figure 1:
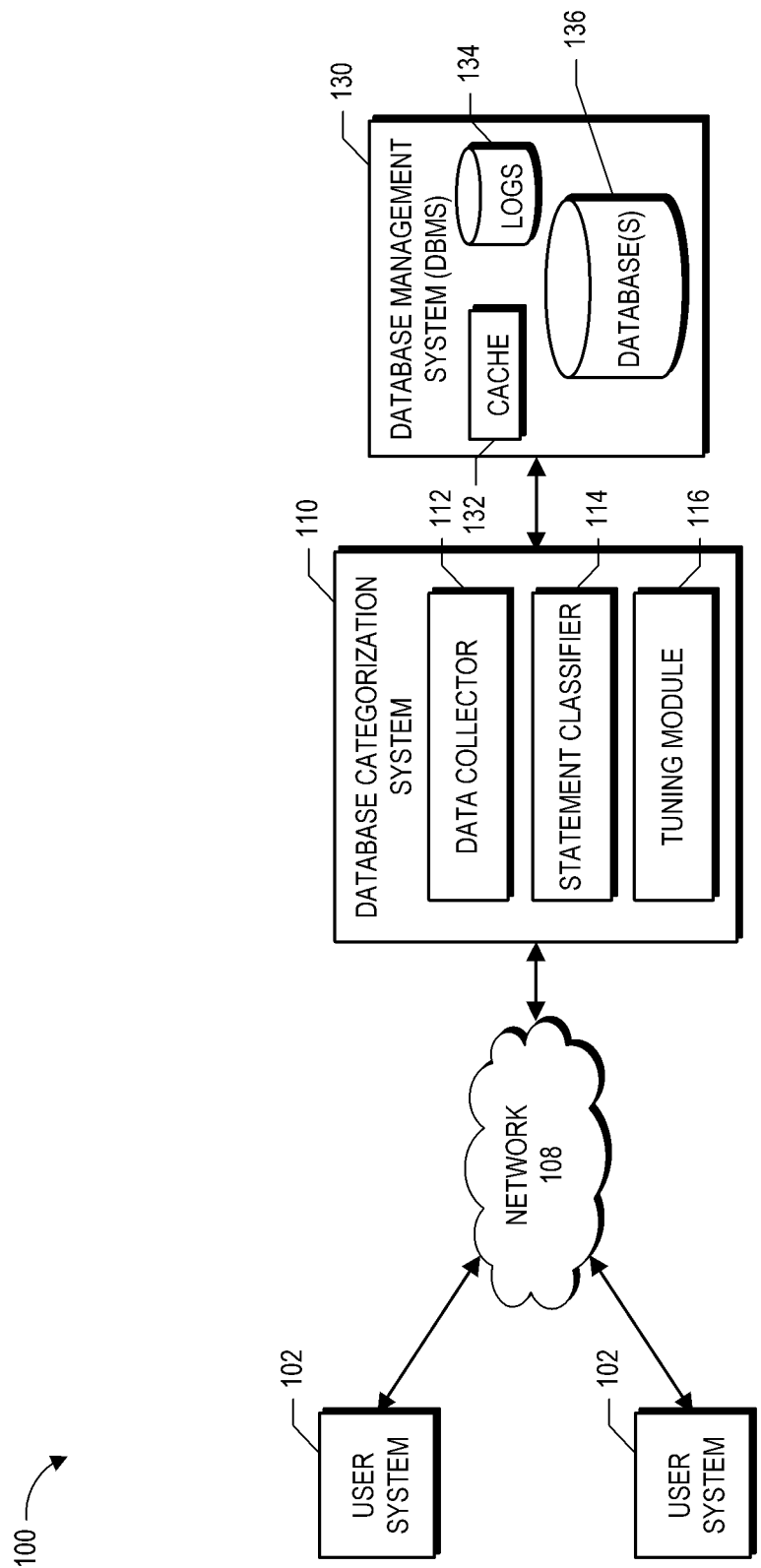
FIG. 1 illustrates an embodiment of a computing environment for providing user systems with access to a database categorization system.

FIG. 1 illustrates an embodiment of a computing environment 100 that provides users with access to a database categorization system 110. The database categorization system 110 is shown in communication with a database management system (DBMS) 130 and user systems 102 over a network 108. The database categorization system 110 can advantageously categorize database statements, such as SQL statements, that have been executed by the DBMS 130. The database categorization system 110 can output categories of database statements for presentation to DBAs or other users. As a result, users can spend less time deciding which statements to tune and more time tuning statements.

The example database categorization system 110 shown includes a data collector 112, a statement classifier 114, and a tuning module 116. Each of these components can be implemented in hardware and/or software. By way of overview, the data collector 112 can communicate with the depicted DBMS 130 to identify information about database statements run by the DBMS 130. Using this statement information, the statement classifier 114 can automatically categorize the database statements. The tuning module 116 can present the categorized statements on a tuning user interface, which one or more users 102 can access via one or more user computer systems 102. The user systems 102 can access the database categorization system 110 over the network 108, or in some embodiments (not shown), locally on the user systems 102.

There are many different examples of DBMSs 130 that the database categorization system 110 can interact with. Some examples of these DBMSs 130 include Microsoft® SQL Server™, Oracle® RDBMS, MySQL™, PostgreSQL™ (Postgres™), as well as any of a variety of NoSQL (non-relational or partially relational) database systems (e.g., Cassandra™, HBase™, Microsoft® Azure Table Services™, MongoDB™, and the like). While only one DBMS 130 is shown, the database categorization system 110 can categorize statements from multiple DBMSs 130 in some embodiments.

The data collector 112 of the database categorization system 110 can collect or otherwise access the database statements from any of a variety of sources in the DBMS 130. Some sources for statement data are shown, including a cache 132 and logs 134. Memory (such as RAM) is another potential source of statement data. More specific data source examples include trace files, procedure caches, plan caches, and the like in Microsoft® SQL Server™ and other databases, and the system global area (SGA) in Oracle® databases, among other data sources.

In addition to accessing statement data, the data collector 112 can also access plan data that includes execution plans for the various statements executed against the database(s) 136. Each SQL statement, for instance, can have an execution plan that reflects execution steps the DBMS 130 will take to implement the SQL statement. The data collector 112 can access the plan data from some or all of the same data sources described above. Uses for the plan data are described in greater detail below.

The statement classifier 114 can process some or all available statement data or plan data, identifying such information as the statements' frequency of execution, the contents of the statements, the execution time of the statements, and so forth. From this and possibly other information, the statement classifier 114 can categorize statements into categories that reflect the tunability of the statements. Tunability can refer to, among other things, the likelihood that a particular statement can be tuned to produce a performance benefit (such as reduced execution time or less memory consumption). Some statements are so optimized that further tuning is unlikely to enhance performance, while others have room for improvement. For example, statements that are associated with web page login processing are often highly optimized and thus may benefit less from tuning. Ad hoc queries from users (especially non-DBA users), on the other hand, are often less refined and therefore more susceptible to tuning.

In some embodiments, tunability can also refer to whether statements can be accessed for tuning at all. Some statements, such as system statements and statements generated by commercial applications, may not be changed directly by a user and can therefore be non-tunable in certain embodiments. These statements still may benefit from tuning, but such tuning can be performed by a vendor in response to a user request rather than directly by a user (see below with respect to FIG. 6).

The statement classifier 114 can run periodically or continuously, for example, as a background process. The statement classifier 114 can continuously categorize statements as they are executed by the DBMS 130. The statement classifier 114 can also or instead be executed on a DBMS 130 occasionally or periodically, for example, whenever a user wishes to tune the database 136. Further, the statement classifier 114 can recategorize certain statements as more information becomes available. Recategorization is described in greater detail below.

The tuning module 116 can output a tuning user interface that includes the statements organized according to the categories provided by the statement classifier 114. The tuning user interface can therefore present data to users from a simplified high level, allowing users to drill down deeper as desired. For example, the tuning module 116 can organize categories according to a hierarchy, tag cloud, or other presentation format. The tuning module 116 can enable users to avoid reviewing every statement when the users work on performance tuning. For instance, the tuning module 116 can visually organize certain less-processing-impactful statements separately from more impactful statements.

Thus, in certain embodiments, the database categorization system 110 can transform information about statements into data representing categorizations of those statements, thereby streamlining performance tuning and allowing users to tune statements more effectively.

Although the statement classifier 114 is described as categorizing statements based on tunability of the statements, the statement classifier 114 may also use other criteria to categorize statements instead of or in addition to tunability. In one embodiment, for example, the statement classifier 114 categorizes statements for cost-allocation purposes. In doing so, the statement classifier 114 may determine the source that generated some or all of the statements, such as a particular application, the system (e.g., the DBMS 130), or the like. Information Technology (IT) personnel can use this information to allocate IT budget costs to the statements or applications based on which applications executed the statements, for instance. The statement classifier 114 may also supply information regarding logical I/O load for some or all of the statements to better enable the IT personnel to make cost allocation decisions.

Further, it should be noted that the database categorization system 110 can execute on one or more computing devices, such as one or more physical server computers. In implementations where the system 110 is implemented on multiple servers, these servers can be co-located or can be geographically separate (such as in separate data centers). In addition, the system 110 can be implemented in one or more virtual machines that execute on one or more physical servers. The database categorization system 110 can be implemented in an organization's computing environment or alternatively in the cloud (e.g., as Software-as-a-Service (SaaS) or the like). Further, it should be noted that the database categorization system 110 can analyze and categorize thousands upon thousands of database statements, which as a practical matter, could not be categorized entirely in the mind of a user.

The network 108 can include a local area network (LAN), a wide area network (WAN), the Internet, or the like. For example, the network 108 can include an organization's private intranet or a combination of an intranet and the public Internet. The user systems 102 can be any of a variety of computing devices, such as desktops, laptops, tablets, smartphones, or other wireless handheld devices, to name a few. Software installed in the user systems 102, such as browser software or other client software, can enable users to access the functionality of the database categorization system 110.

III. Example Database Categorization Process

Various example database categorization processes will now be described. Each of these processes can be implemented by any of the systems described herein, including the database categorization system 110 and systems described below with respect to FIG. 5. For ease of illustration, however these processes will be described in the context of the database categorization system 110.

Figure 2:
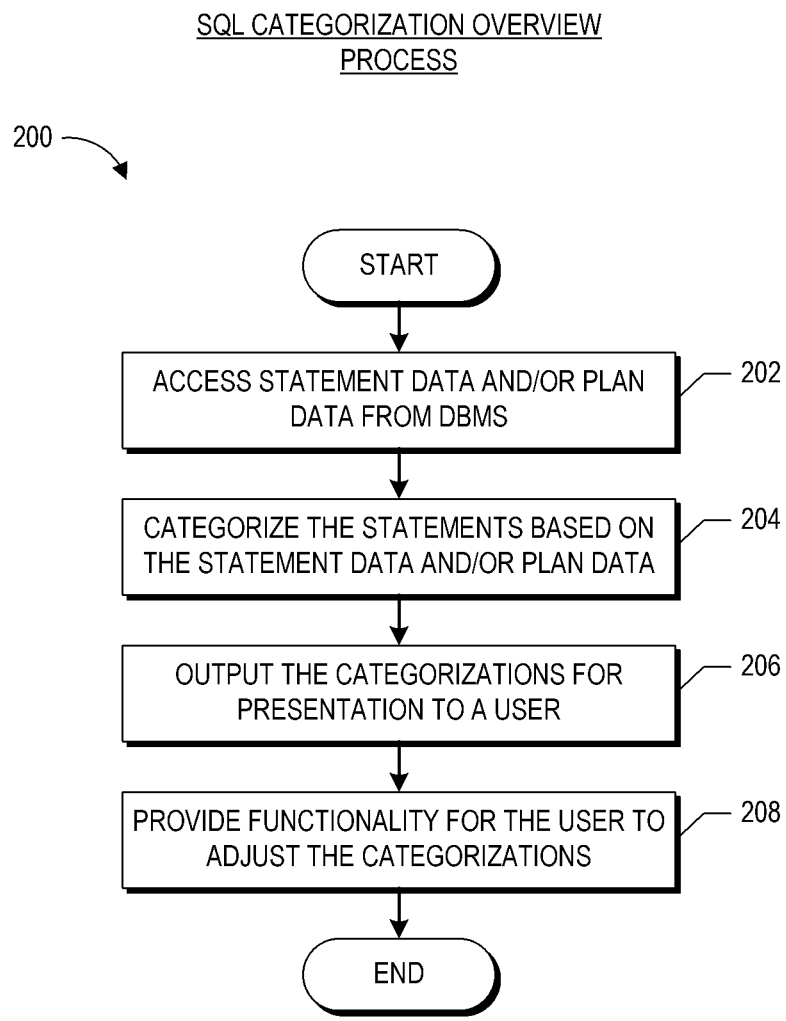
FIG. 2 illustrates an embodiment of a database categorization process that can be implemented by the database categorization system of FIG. 1.

Referring to FIG. 2, an embodiment of a database categorization process 200 is shown. The database categorization process 200 represent an overview of database categorization. At block 202 of the process 200, the data collector 112 accesses statement data and/or plan data from the DBMS 130. The data collector 112 can access this data periodically or continuously, as described above. In some embodiments, the data collector 112 samples the statement or plan data to obtain representative portions thereof, such as statements executed during four one-hour blocks each day or some other sample.

Using the statement data and/or plan data, the statement classifier 114 categorizes the statements at block 204. As described above, this categorization can reflect the tunability of the statements, thereby providing a user with better visibility into the tunable aspects of a database's workload. The categorization can take on many forms. Statements can be categorized in a binary fashion, such as tunable or non-tunable, or tunable and less-tunable. Another approach is to categorize statements as tunable, less-tunable, and non-tunable. Less-tunable statements may be statements that the statement classifier 114 considers potentially, but not likely, tunable. Further, statements can be categorized based on a sliding scale of tunability. Instead of discrete categories, for instance, statements can be assigned a number or other indicator that reflects their tunability.

Other categorizations are also possible. For instance, statements can be categorized based on the application that the statements are associated with. Statements associated with a PeopleSoft™ application, for example, can be grouped under one category, Sharepoint™-generated statements under another, and so forth. Layers of categorizations may also be created. As an example, higher-level categories such as "tunable" and "less-tunable" can include subcategories, such as different custom application activity (possibly under "tunable") and DBMS system activity (possibly under "less-tunable" or a "non-tunable" category). More detailed categorization techniques are described below with respect to FIGS. 3 and 4.

At block 206, the tuning module 216 outputs the categorizations for presentation to a user. In doing so, the tuning module 216 can electronically generate one or more user interfaces that depict user-selectable categories that organize statements for tuning. In one embodiment, the user interface can present options for users to filter out (e.g., hide) statements by category. The tuning module 116 can also output metadata or other information associated with the statements, such as which user executed a particular statement, the database it was executed on, its execution time or duration, or potentially other statement characteristics. The tuning module 116 can organize the categorized statements by their category, their active time, resource consumption, contention, or other criteria.

At block 208, the tuning module 216 optionally provides functionality for the user to adjust the categorizations. The tuning module 116 can, for instance, provide functionality for users to assign names to the automatically-generated categorizations made by the statement classifier 114. Such user-defined categorizations can allow users to more quickly focus on and address the tunable aspects of their SQL application workload. The tuning module 116 may also provide options for users to uncategorize items categorized by the statement classifier 114. These options can include context menus (e.g., available with a right mouse click) or the like. The tuning module 116 may also allow statements to be dragged from one category and dropped to another. Thus, users can categorize statements that the statement classifier 114 did not initially categorize.

Figure 3:
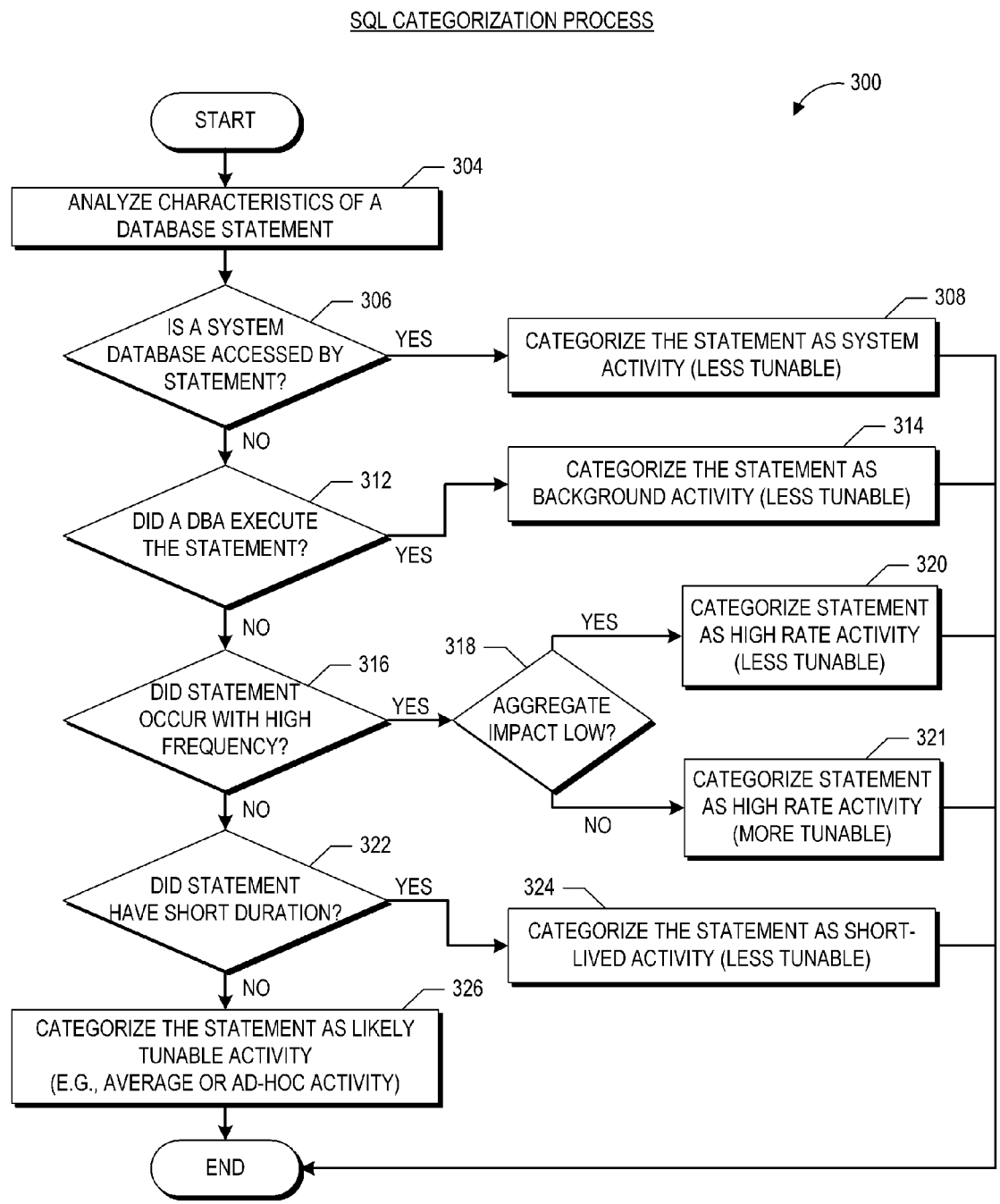
FIG. 3 illustrates another embodiment of a database categorization process that can be implemented by the database categorization system of FIG. 1.

FIG. 3 illustrates another embodiment of a database categorization process 300. The database categorization process 300 is a more detailed example implementation of block 204 of the process 200. The statement categories described with respect to FIG. 3 are merely examples of one type of categorization that can be performed by the database categorization system 110. The process 300 will be described in the example context of being implemented by the statement classifier 114. In the process 300, the statement classifier 114 analyzes several different characteristics of a database statement to determine how to classify the statement. The statement classifier 114 can analyze any subset of the characteristics shown in other embodiments.

At block 304, the statement classifier 114 analyzes the characteristics of a database statement. These characteristics can include, among other things, the context of a statement, internal handle(s) of a statement, the structure of a statement, the content of a statement, a statement's execution plan, a statement's frequency of execution, a statement's duration of execution, a statement's time of execution, and the like. The context of a statement can include, among others, the database context, user context, and machine context. The database context can include the database or databases that the statement accesses. The user context can include data representing the name of a user or users who accessed the statement, optionally with characteristics of the user (such as the user's role, level of access or permissions to the database, and so forth). The machine context can identify the particular machine that executed the statement, which may be a user machine or a machine not operated directly by a user (such as a server). From these statement characteristics and possibly other information, the statement classifier 114 can categorize statements into categories such as system activity, background activity, high frequency activity, short-lived activity, end user activity, and likely tunable activity. Each of these example categories are described in turn.

At decision block 306, the statement classifier 114 determines whether a system database was accessed by the statement. System databases include databases that are typically managed directly by a DBMS 130 rather than by a user. Hence, statements executed on system databases are less likely to be tunable or not tunable at all. Currently, DBAs tend to waste a lot of time determining whether statements are system or user statements. Identifying and categorizing system statements can therefore save DBA tuning time.

The statement classifier 114 can identify a statement as accessing a system database by examining the statement itself or a log file that includes a record of the statement's execution on a system database. The statement classifier 114 can evaluate whether the database accessed by the statement is a system database by attempting to match the accessed database name with one of several common system database names. Some common system database names for the SQL Server™ DBMS, for example, include "master," "msdb," "model," "resource," and "tempdb."

If the statement classifier 114 detects one of these names (or a system database name in another DBMS) associated with the statement, the statement classifier 114 categorizes the statement as likely system activity at block 308. As shown in FIG. 3, system activity is less tunable than other activity, or in some cases, not tunable at all. Thus, creating a category for system activity can enable users to ignore or assign a lower priority to such activity in their tuning efforts.

The statement classifier 114 determines, at decision block 312, whether a DBA (or similar user) executed the statement. The statement classifier 114 can determine which user executed the statement by accessing the user context or machine context associated with the statement. Information on which user or machine executed the statement may be found in the statement itself, a log associated with the statement, or the like. The statement classifier 114 can access an employee database in one embodiment to identify whether the user is a DBA or the like. If the user that executed the statement is a DBA or has similar access rights to the database (such as root-level access), or if the machine identified as having executed the statement is a machine of such a user, the statement classifier 114 can categorize the statement as background activity at block 314. Some examples of background activity include batch activity, log shipping, database mirroring, backup and recovery, hardening database records, and similar operations. Like system activity, background activity is often less tunable or not tunable and therefore merits less tuning attention from a user.

At decision block 316, the statement classifier 114 determines whether the statement occurred with high frequency. The statement classifier 114 can determine whether a statement executes frequently by counting the number of times it is executed in a given period of time, such as a day. As an example of high frequency statements, logins by users (such as to a web site) tend to generate statements for checking permissions against an authentication database. These statements can occur many times in a given day and are typically executed quickly. Other examples of high frequency queries include requests for product details, viewing or changing user account information, and the like. These queries tend to have definitive start and end points and may run so often that their aggregate impact is high. A currently-available tuning system might recommend these statements to be tuned given their aggregate impact, even though they may not be tunable. By grouping together these statements, the statement classifier 114 can help users avoid having to wade through these less-tunable statements to find more-tunable statements.

Identifying repeated execution of a statement can be a nontrivial problem. While some statements repeat precisely with the exact same language, others do not. Instead, some statements may have subtle differences (e.g., due to changes in table names or other literals), while causing the same execution steps to be performed. One way to identify such similar but not precisely identical statements is to remove comments, literals, and the like and then compare the remaining text. For example, the statement classifier 114 can remove the comments and literals, take a hash of the statement, and store the hash in computer storage. The statement classifier 114 can then compare this hash with the hashes of other statements to determine whether the hashes are identical. If the hashes are identical, the statement classifier 114 can mark the statements as being identical. The statement classifier 114 can also perform text matching without hashing.

Another approach for identifying matching statements is to examine the explain plan for each statement. The explain plan for similar statements can be the same or approximately the same even though statements may differ slightly. The statement classifier 114 may perform similar processing on the explain plans for different statements. For example, the statement classifier 114 can remove literals, hash a plan, and compare the hash with other plan hashes, or alternatively, perform text matching without hashing.

If the statement occurs with high frequency, it is further determined whether the aggregate impact of the statement is high or low at decision block 318. If it is low, then the statement classifier 114 can classify the statement as high rate activity that is less tunable. If the impact is high, the statement classifier 114 can categorize the statement as high rate activity that may be tunable. The statement classifier 114 can determine the aggregate impact of a statement by evaluating the logical I/O performed by a statement. The statement classifier 114 can access this logical I/O information in some DBMSs 130 from a trace file of the DBMS 130, which may have a column that gives logical I/O statistics for each statement. In other DBMSs 130, the statement classifier 114 can also access logical I/O information from a procedure cache. If the statement classifier 114 determines that the statement generates a high number of logical reads on the database, the statement classifier 114 can assess the statement as having a high aggregate impact. Conversely, if the statement generates a relatively lower number of logical reads, the statement classifier 114 can assess the statement as having a lower aggregate impact.

In some embodiments, the statement classifier 114 does not distinguish high rate activity based on aggregate impact but instead groups some or all high rate activity under a single category. The statement classifier 114 may also output a number associated with each statement, which number can represent the aggregate impact of that statement. The number may, for instance, represent the number of logical reads performed by the statement in a given period of time (such as an hour, day, week, etc.).

At decision block 322, the statement classifier 114 determines whether the statement had a short duration. Some statements occur infrequently or are short-lived and therefore may merit less tuning effort. The statement classifier 114 can identify such statements, for example, by examining logs to identify the statement's duration. If the statement is short-lived, the statement classifier 114 categorizes the statement as short-lived activity at block 324.

If the statement does not fall in any of the above categories, the statement classifier 114 categorizes the statement as likely tunable activity at block 326. Another way to categorize the statement in such a situation is to consider the statement moderate or average activity, tunable user activity, or the like. This activity can include statements that consume significant processing resources without running very frequently. These statements can further include application statements, ad hoc user queries (such as custom reports obtained using business intelligence software), and the like. In some embodiments, the statement classifier 114 further classifies this likely tunable activity into further subcategories such as moderate activity, ad hoc activity, user activity, application activity, and the like.

Some of the statements classified as tunable by the statement classifier 114 at block 326 may not actually be tunable by a user. Instead, these statements can include statements generated by commercial applications. In one embodiment, the statement classifier 114 groups commercial application statements into a separate category or puts these statements into a "less likely tunable" or "non-tunable" category. The statement classifier 114 can also group such statements by their respective commercial applications, creating categories for each application. Although a user may not be able to tune such statements, the categorization of statements by application can still be useful. A user can identify performance bottlenecks in a commercial application based on the categorization and contact the vendor of the application to initiate a potential resolution.

Figure 4:
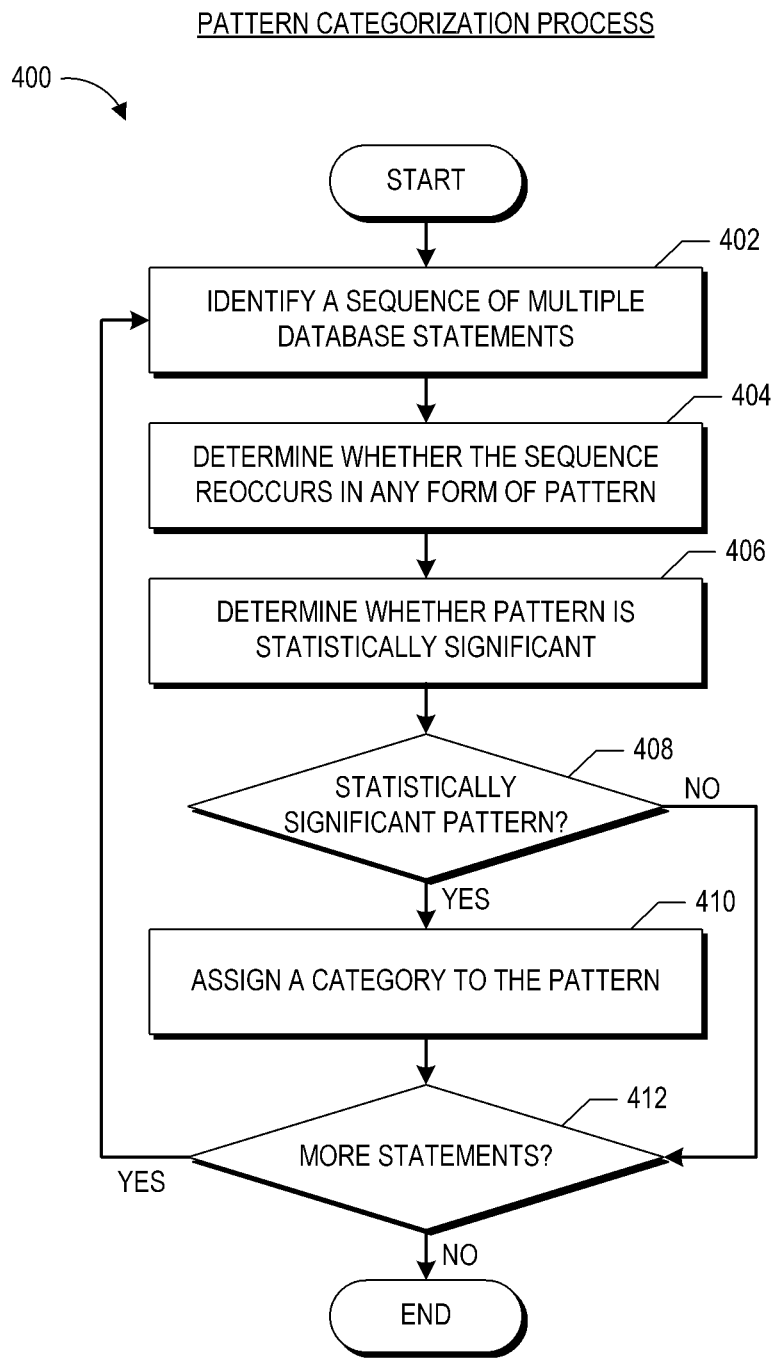
FIG. 4 illustrates an embodiment of a pattern categorization process that can be implemented by the database categorization system of FIG. 1.

FIG. 4 illustrates an embodiment of a pattern categorization process 400. The pattern categorization process 400 can be used by the statement classifier 114 to identify statements that occur together in patterns. The pattern categorization process 400 can be used, for instance, to further subcategorize moderate or tunable activity. One potential benefit of identifying patterns is that the process 400 can reduce noise by consolidating statements that occur together, thereby reducing the number of individual statements a user needs to sift through to find one to tune.

Another potential benefit of the process 400 in certain embodiments is that the process 400 can identify statements that are associated with an aspect of an application. Such process discovery can identify processes, transactions, or the like that represent discrete units of work in an application. For example, a group of statements might relate to the generation of a report by an application, the purchase of an item, or the filling out of a web form. Providing such high-level process information about groups of statements can help users more quickly troubleshoot performance bottlenecks of an application.

At block 402, the statement classifier 114 identifies a sequence of multiple database statements. The sequence can include statements that occur together consecutively or interspersed among other statements. Sequences of interest may be of any length or number of statements, but are typically more than two (although two statements may also be a sequence). At block 404, the statement classifier 114 determines whether the sequence reoccurs in any form of pattern. The pattern can simply be multiple occurrences of the group of statements. The pattern can also be a reoccurrence of the same group of statements but in a different order. Further, the pattern can be the reoccurrence of any subset of the group of statements. Detection of reoccurring statements can be used with any of the techniques used to detect reoccurring statements for the high-rate activity categorization described above with respect to FIG. 3.

At block 406, the statement classifier 114 determines whether the pattern is statistically significant. In doing so, the statement classifier 114 can determine whether the group of statements reoccurred a sufficient number of times to warrant the group being considered a pattern. In doing so, the statement classifier 114 can use any standard statistical techniques to evaluate significance. For example, the statement classifier 114 can perform k-means clustering with respect to the statements, analysis of variance with respect to the statements, combinations of the same, or the like. If the pattern is statistically significant (block 408), the statement classifier 114 assigns a category to the pattern at block 410. Otherwise, the statement classifier 114 determines whether there are additional statements to evaluate at block 412. Then the process 400 either loops back to block 402 or ends.

IV. Example Centralized Categorization System and Process

In some organizations, the database categorization system 110 finds sufficient statement data in existing logs or caches of a DBMS to rapidly create robust categorizations upon installation. However, in other organizations, it may take more time for the database categorization system 110 to categorize some or all statements. This potential time delay can occur because the available statement or plan data may be sparse or not representative of the DBMS's full workload. As a result, the database categorization system 110 may initially spend more time observing the DBMS's workload than assigning categories to the workload. Once the database categorization system 110 becomes confident that statements belong with certain categories (e.g., once a statistically significant number of statements are processed), the system 110 may output statement categorizations for presentation to a user.

Figure 5:
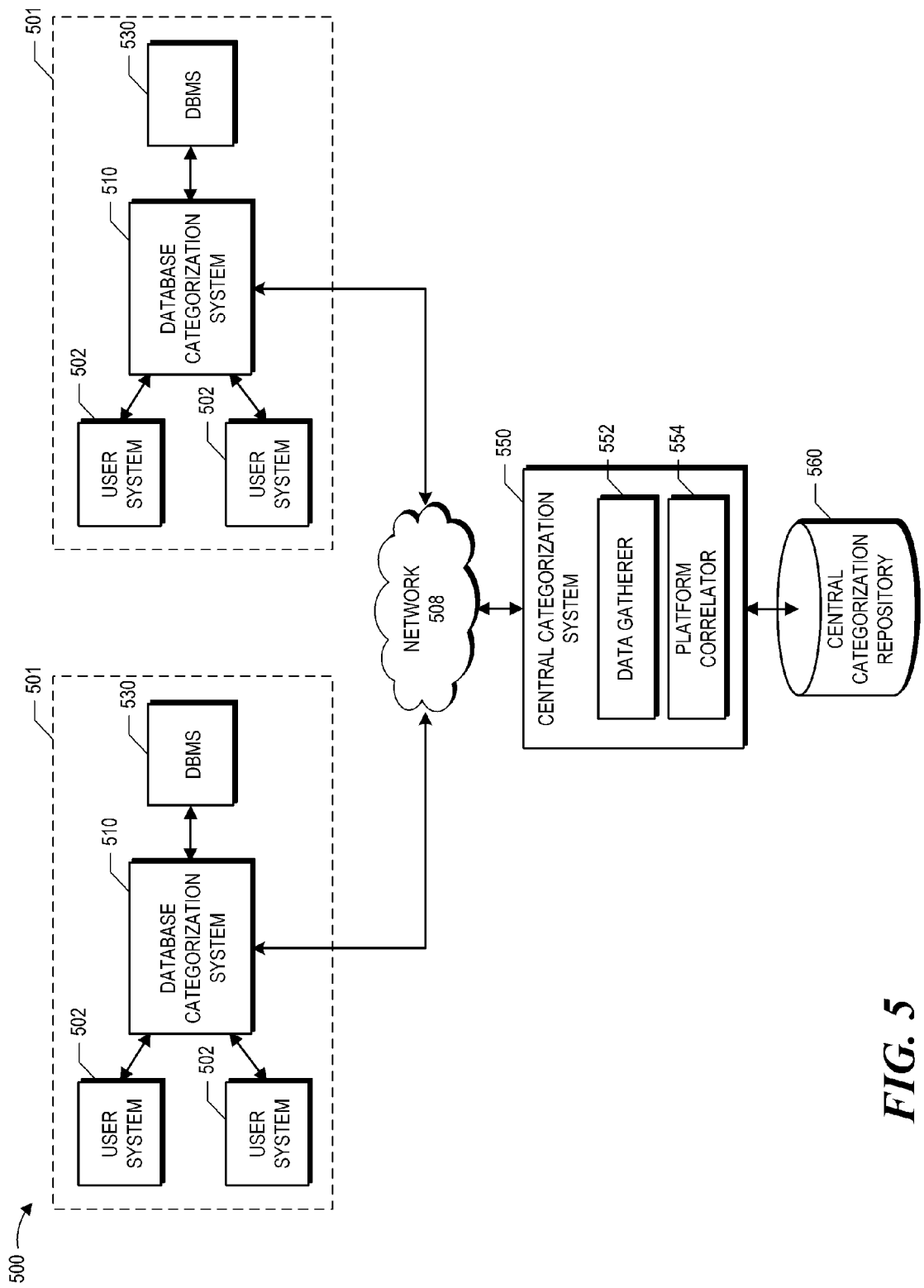
FIG. 5 illustrates an embodiment of a computing environment for providing database categorization systems of multiple organizations with access to a central categorization system.

To shorten this time delay, the system 110 can leverage categorizations made by other installations of the system 110. An embodiment for doing so is illustrated in FIG. 5. Shown in FIG. 5 is an example computing environment 500 for providing database categorization systems 510 of multiple organizations with access to a central categorization system 550. Two organizations are represented in the FIGURE by computing environments 501. Each computing environment 501 includes a database categorization system 510, user systems 502, and a DBMS 530, each of which may have all of the functionality described above. The database categorization systems 510 for each organization communicate with a central categorization system 550 over a network 508 (e.g., a LAN, WAN, the Internet, or the like).

The central categorization system 550 can be maintained by a vendor of the database categorization system 110 or by another entity. Like the database categorization system 110, 510, the central categorization system 550 can have any of the software or hardware components described above with respect to FIG. 1 and elsewhere herein. In the depicted embodiment, the central categorization system 550 includes a data gatherer 552 and a platform correlator 554. These components are also in communication with a central categorization repository 560.

In some embodiments, the database categorization systems 510 make categorization data available to the central categorization system 550. This categorization data can include metadata on categories that particular statements have been assigned to, the statements themselves, hashes thereof, or the like. The data gatherer 552 of the central categorization system 550 can store this information in the central categorization repository 560 for subsequent processing by the platform correlator 554. The platform correlator 554 can determine whether a first database categorization system 510 has encountered similar statements to a second system 510. If so, the platform correlator 554 can recommend categorizations to the first system 510 based on the categorizations obtained from the second system 510 (or multiple systems). The central categorization system 550 can therefore provide categorization software as a service (SaaS) in some implementations. Administrators can opt-in or opt-out of this categorization sharing functionality. Further, privacy controls may be included within any of the systems 510, 550 to reduce the risk of sharing private data.

An advantage to this categorization sharing feature in some embodiments is that database categorization systems 510 that are nascent in operation may bootstrap their categorizations based on patterns or other categorizations detected by other systems 510. Thus, a database categorization system 510 that has just been installed can quickly provide value to its users by categorizing statements that have been similarly categorized by other systems 510. These benefits may exist not just for newer database categorization system 510 but also for any system 510 that detects new statements. An organization may install a new application, for instance, which generates statements that a database categorization system 510 has not previously encountered. The database categorization system 510 can access the central categorization system 550 to determine whether such statements have been classified in the past. If so, the central categorization system 550 can provide categorization suggestions or recommendations to the requesting database categorization system 510.

Figure 6:
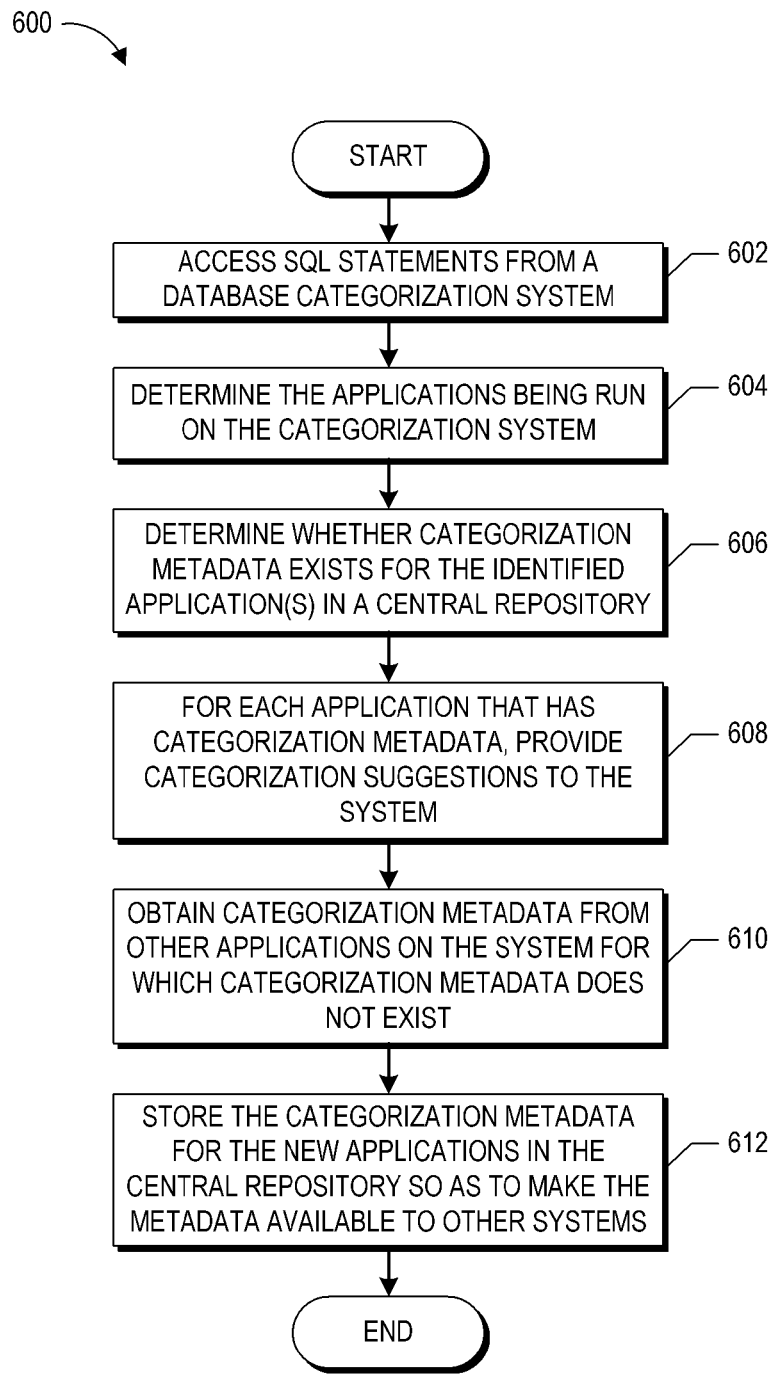
FIG. 6 illustrates an embodiment of an application correlation process that can be implemented by the central categorization system of FIG. 5.

FIG. 6 illustrates an embodiment of a platform correlation process 600 that can be implemented by the central categorization system 550 of FIG. 5. The platform correlation process 600 depicts one example technique for correlating database statements between different database categorization systems 510 based on application installation detection.

At block 602, the data gatherer 552 accesses database statements from a database categorization system 510. The platform correlator 554 determines the applications being run on the database categorization system 510. For example, the platform correlator 554 can analyze the gathered statements to identify applications that are installed on the database categorization system 510. Information indicative of a particular application may be found in many places, including a database name accessed by a statement, an "application name" column or the like that may be accessed by a statement, in separate application performance monitoring data, or the like.

At block 606, the platform correlator 554 determines whether categorization metadata exists for the identified application(s) in the central repository 560. For each application that has categorization metadata, the platform correlator 554 provides categorization suggestions to the database categorization system 510. Optionally, the data gatherer 552 can also obtain categorization metadata from other applications on the system 510 for which categorization metadata does not yet exist in the central repository 560. The data gatherer 552 can store this categorization metadata for the new applications in the central repository 560 so as to make the metadata available to other systems 510.

V. Example User Interfaces

Figure 7:
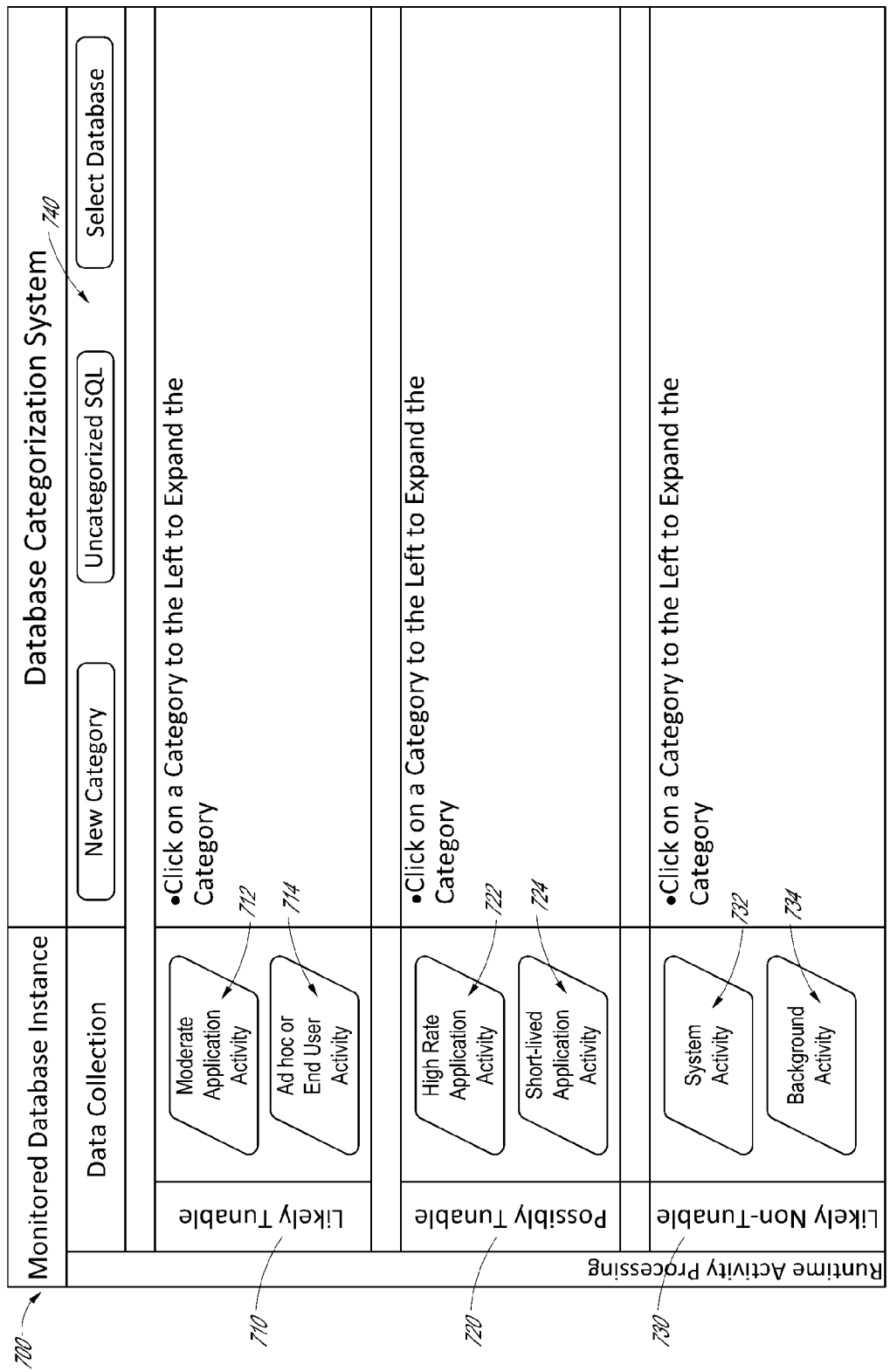
FIGS. 7 through 9 illustrate embodiments of user interfaces that can be generated by the systems of FIG. 1 or 5.
Figure 8:
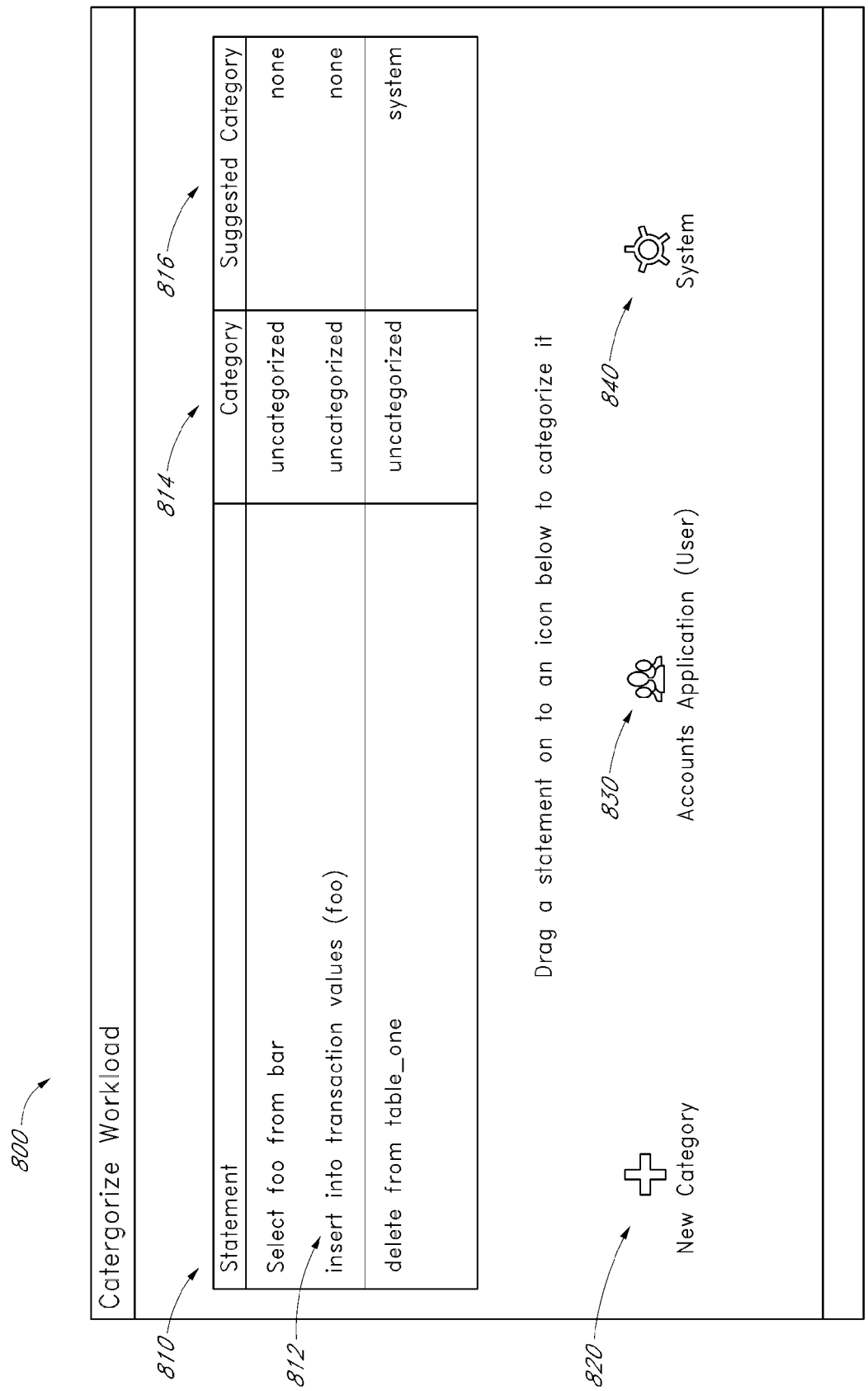
Figure 9:
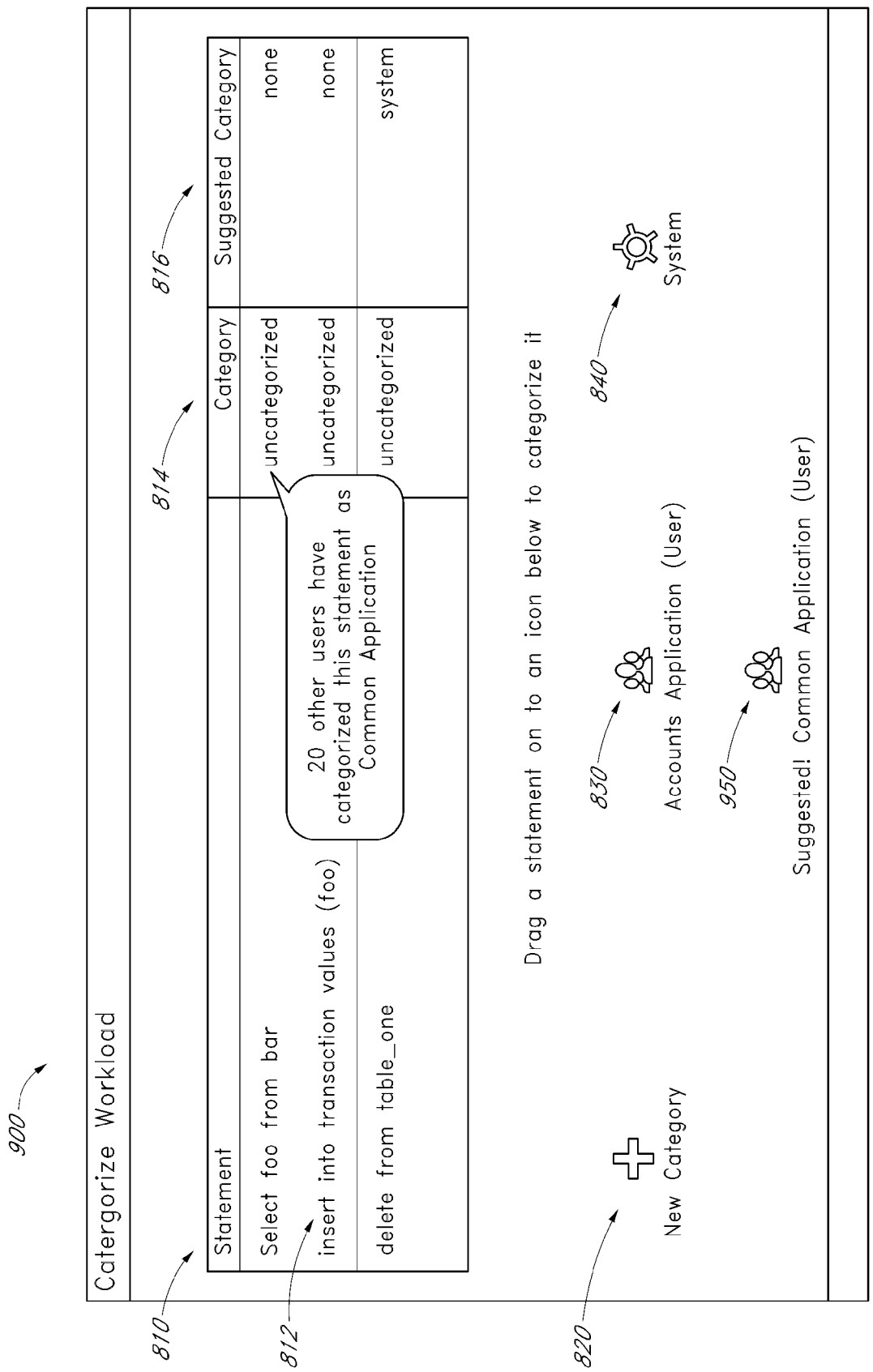

FIGS. 7 through 9 illustrate embodiments of tuning user interfaces 700-900 that can be generated by the systems 110, 510, 550 of FIG. 1 or 5, such as by the tuning module 116. These user interfaces 700-900 may be implemented as web pages, Windows®, Mac®, tablet, or smartphone applications, or the like. Further, the user interfaces 700-900 may be accessed by the user systems 102, 502.

Referring to FIG. 7, the tuning user interface 700 includes statement categories that may be generated based on the principles described above. These categories include higher level categories 710, 720, 730 and subcategories 712, 714, 722, 724, 732, 734. The higher level categories include a likely tunable category 710, a possibly tunable category 720, and a likely non-tunable category 730. In the likely tunable category 710 are subcategories such as moderate application activity 712 and ad hoc or end user activity 714. In the possibly tunable category 720, subcategories are included for representing high rate application activity 722 and short-lived application activity 724. Further, in the likely non-tunable category, system activity 732 and background activity 734 subcategories are provided. These categories are described in greater detail above with respect to FIG. 3.

A user may select one of the categories shown to drill down and view further subcategories and/or statements. The subcategories 712, 714, 722, 724, 732, 734 shown may further include subcategories organized based on the type of application, patterns detected, or other criteria. The various categories and subcategories may be organized in a hierarchical tree structure, like a file system. In some embodiments, a confidence value can be graphically depicted with some or all of statements, which can indicate the system's 110, 510, 550 confidence that the statement belongs in a particular category. This confidence value may be expressed as a percentage and may be based on the statistical significance measures described above. The system 110, 510, or 550 may weight the confidence for a particular statement higher if a user categorizes a similar statement in the same category.

Additional buttons 740 provide options for users to create a new category, view uncategorized statements, and to select a different database. Many other options and configurations may be provided in other embodiments. For example, instead of listing the particular subcategories 712, 714, 722, 724, 732, 734 shown in FIG. 7, subcategories can be provided based on the application. Such subcategories can include categories such as "custom applications" (which may fall under the likely tunable category 710), "commercial applications" (in the possibly tunable category 720), and "system applications" (in the likely non-tunable category 730). Of course, these categorizations are also examples and can be varied in other embodiments.

In FIG. 8, another tuning user interface 800 is shown that presents categorized statement data 810 in a different manner than in the user interface 700. However, features of the user interface 800 may be combined with the features of the user interface 700.

In the tuning user interface 800, categorized statement data 810 is presented in a tabular format having a statement column 812, a category column 814, and a suggested category column 816. In this embodiment, the database categorization system 110, 510, or 550 identifies suggested categories 816 for some or all statements. Users may then drag a statement to one or more categories 830, 840 below to categorize the statement. The example categories 830, 840 shown include an "accounts application" user category 830 and a system category 840. A user interface control 820 is also provided for defining new categories. As used herein, in addition to having its ordinary meaning, the term "categorizing" and its derivatives can mean suggesting a category for a statement, assigning a statement to a category, or both, among other things.

A similar user interface 900 is shown in FIG. 9. In this embodiment, the user interface 900 includes all the features of the user interface 800 and also includes a third category, a suggested common application category 950. This common application category 950 is suggested by the central categorization system 550 in one embodiment. One of the statements (in column 812) is identified as likely belonging to this "common application" category. A popup box 918 also informs a user that "20 other users have categorized this statement as Common Application." Based on this information, a user may choose to add the statement to the common application category.

VI. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Although certain computer-implemented tasks are described as being performed by a particular entity, other embodiments are possible in which these tasks are performed by a different entity.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for categorizing database statements, the system comprising:
   a data collector configured to electronically access, from a database management system, a plurality of structured query language (SQL) statements that have executed on the database management system (DBMS);
   a statement classifier comprising computer hardware, the statement classifier configured to:
      programmatically analyze the SQL statements to identify characteristics of the SQL statements, and
      categorize the SQL statements into categories that reflect tunability of the SQL statements based at least in part on the identified characteristics of the SQL statements; and
   a tuning user interface configured to be electronically generated for presentation to a user, the tuning user interface comprising a description of the categories, thereby enabling the user to select for tuning a subset of the SQL statements based on the categories.

2. The system of claim 1 wherein the categories comprise a category that represents relatively more tunable statements and a category that represents relatively less tunable statements.

3. The system of claim 2, wherein the categories comprise one or more of the following categories: system activity, background activity, high rate activity, short lived activity, ad hoc activity, end user activity, moderate activity, and application activity.

4. The system of claim 3, wherein at least the following categories reflect relatively more tunable statements: moderate activity, ad hoc activity, and end user activity.

5. The system of claim 3, wherein at least the following categories reflect relatively less tunable statements: system activity, background activity, and short lived activity.

6. The system of claim 1, wherein the characteristics of the SQL statements comprises one or more of the following: a user who executed a given statement, a database upon which the given statement was executed, a machine that executed the given statement, and text of the statement.

7. A method of categorizing database statements, the method comprising:
   by a computer system comprising computer hardware:
      electronically accessing, from a database management system, a plurality of database statements executed on the database management system;
      programmatically analyzing the database statements to identify characteristics of the database statements;
      categorizing the database statements into categories that reflect tunability of the database statements based at least in part on the identified characteristics of the database statements;
      electronically generating a tuning user interface that includes a description of the categories; and
      outputting the tuning user interface for presentation to a user, thereby enabling the user to select for tuning a subset of the database statements based on the categories.

8. The method of claim 7, further comprising providing functionality for the user to adjust the categorizations.

9. The method of claim 7, wherein the categories comprise a tunable category and a non-tunable category.

10. The method of claim 7, wherein the categories comprise a tunable category and a less-tunable category.

11. The method of claim 7, wherein the categories comprise one or more of the following categories: system activity, background activity, high rate activity, short lived activity, ad hoc activity, end user activity, moderate activity, and application activity.

12. The method of claim 7, wherein said programmatically analyzing the database statements to identify characteristics of the database statements comprises identifying one or more of the following: database contexts of the database statements, user contexts of the database statements, machine contexts of the database statements, and internal handles of the statements.

13. The method of claim 7, wherein the database statements comprise one or more of the following: SQL statements and non-relational statements.

14. The method of claim 7, wherein the computer system comprises a plurality of computing devices.

* * * * *